US008935122B2

(12) United States Patent
Stisser

(10) Patent No.: US 8,935,122 B2
(45) Date of Patent: Jan. 13, 2015

(54) ALIGNMENT DETECTION DEVICE

(75) Inventor: Daryl A. Stisser, Visalia, CA (US)

(73) Assignee: US Tower Corp., Lincoln, KS (US)

( * ) Notice: Subject to any disclaimer, the term of this patent is extended or adjusted under 35 U.S.C. 154(b) by 450 days.

(21) Appl. No.: 13/311,216

(22) Filed: Dec. 5, 2011

(65) Prior Publication Data

US 2012/0143561 A1 Jun. 7, 2012

Related U.S. Application Data

(60) Provisional application No. 61/419,513, filed on Dec. 3, 2010.

(51) Int. Cl.

| | |
|---|---|
| ***G06F 15/00*** | (2006.01) |
| ***H01Q 1/12*** | (2006.01) |
| ***H01Q 3/02*** | (2006.01) |
| ***H01Q 3/00*** | (2006.01) |
| *H01C 1/125* | (2006.01) |

(52) U.S. Cl.

CPC ................. *H01Q 1/125* (2013.01); *H01Q 3/02* (2013.01); *H01Q 3/005* (2013.01); *H01C 1/125* (2013.01)

USPC ........... 702/150; 342/173; 342/352; 342/359; 343/760; 343/761; 343/763; 455/12.1; 455/67.15

(58) Field of Classification Search

CPC ....... H01Q 3/005; H01Q 1/125; H01Q 1/243; H01Q 3/02

USPC ........... 702/150; 342/173, 352, 359; 343/760, 343/763, 761; 455/12.1, 67.15

See application file for complete search history.

(56) References Cited

U.S. PATENT DOCUMENTS

| | | | | | |
|---|---|---|---|---|---|
| 4,888,592 | A * | 12/1989 | Paik et al. | ..................... | 342/359 |
| 5,313,215 | A * | 5/1994 | Walker et al. | ................. | 342/352 |
| 7,636,067 | B2 * | 12/2009 | Norin | ............................ | 343/760 |
| RE42,472 | E * | 6/2011 | Dybdal et al. | ................ | 342/173 |
| 8,022,885 | B2 * | 9/2011 | Smoyer et al. | ................ | 343/763 |
| 8,106,842 | B2 * | 1/2012 | Norin | ............................ | 343/760 |
| 8,471,780 | B2 * | 6/2013 | Dalmazzo | ..................... | 343/894 |
| 8,559,886 | B2 * | 10/2013 | Zhao | .......................... | 455/67.15 |
| 2006/0017809 | A1 * | 1/2006 | Carroll | .......................... | 348/158 |
| 2009/0033576 | A1 * | 2/2009 | Smoyer et al. | ................ | 343/761 |
| 2010/0164833 | A1 * | 7/2010 | Dalmazzo | ..................... | 343/894 |

* cited by examiner

*Primary Examiner* — Carol S Tsai

(74) *Attorney, Agent, or Firm* — Kenneth D'Alessandro, Esq.; Leech Tishman Fuscaldo & Lampl

(57) ABSTRACT

An alignment device provides position information for an antenna coupled to an extendable tower. The alignment device can provide position data including pitch data, roll data, and azimuth data. The position data can be collected at multiple times, and reported to a remote computing device. The position data can be reported as the raw measured data, a delta between two sets of position data, or other data. The alignment device may be solar powered and include a transceiver client for communicating with a remote computing device via a transceiver server.

19 Claims, 5 Drawing Sheets

ALIGNMENT DETECTION DEVICE

CROSS REFERENCE TO RELATED APPLICATIONS

The present application is claims the priority benefit of U.S. provisional patent application 61/419,513, filed Dec. 3, 2010, and titled "Wireless Solar Compass Antenna Alignment System", the disclosure of which is incorporated herein by reference.

BACKGROUND

Narrow band antennas are used to communicate with a broad array of systems. The communication requires that the narrow band antennas be directed towards the particular system. The direction may be set by performing a bore sight operation on the antenna to direct the antenna communication waves towards the system intended to receive the antenna signal.

Narrow band antennas should be directed towards a system for communication to occur. Therefore, it is important that the line of communication be as free as possible from interference and objects that obstruct the signal. Obstruction of the signal distortion in the antenna signal and prevent proper communication between the antenna and the system in communication with the antenna.

What is needed is an improved system for positioning an antenna with minimal signal obstruction.

SUMMARY OF THE INVENTION

The present technology provides an alignment device for providing position information for an antenna coupled to an extendable tower. The alignment device can provide position data including pitch data, roll data, and azimuth data. The position data can be collected at multiple times, and reported to a remote computing device. The position data can be reported as the raw measured data, a delta between two sets of position data, or other data. The alignment device may be solar powered and include a transceiver client for communicating with a remote computing device via a transceiver server.

In an embodiment, a method for determining an alignment may include receiving a first set of position data over a wireless connection from an alignment device coupled to a structure. The first set of position data may be associated with an alignment of a portion of the structure which is not within reach of a user. The structure may be configured to be extendable such that a portion of the structure having the alignment device extends to a position out of reach of the user. The position data may be provided to a user through an interface.

In an embodiment, a system for determining a structure alignment may include an independent power source, a digital compass, a transceiver and a housing. The digital compass receives power from the independent power source and may be configured to provide position data associated with the position of the system. The transceiver receives power from the independent power source and may be configured to transmit the position data to a remote computing device. The housing contains the digital compass and the transceiver and may be attached to an extendable structure.

DETAILED DESCRIPTION

Figure 1:
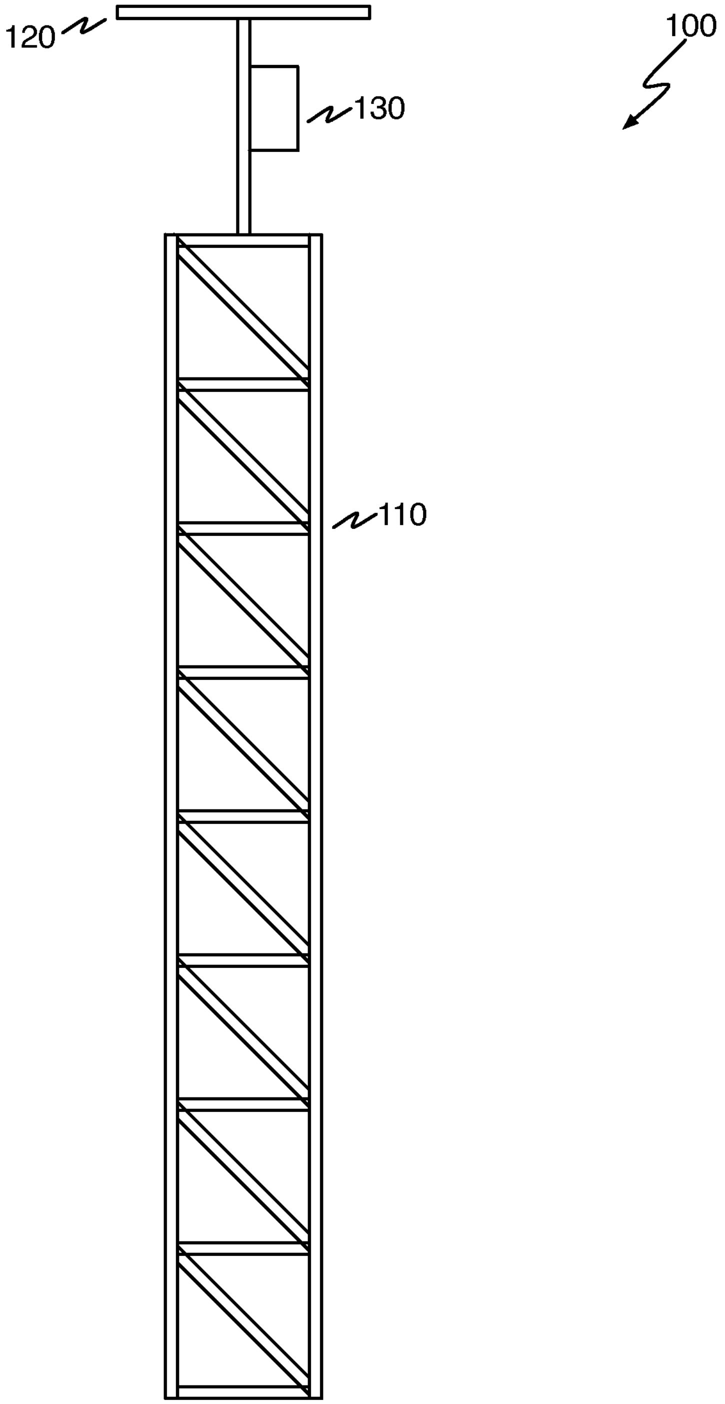
FIG. 1 illustrates an exemplary extendable structure having an alignment device.

FIG. 1 illustrates an exemplary extendable structure having an alignment device. The extendable structure 100 of FIG. 1 includes an extendable structure 110, an antenna 120 and an alignment device 130. The extendable structure may be a tower or any other structure that may be extendable. The structure may be extendable by a controller which may be operated by a user, manually by a user, or in some other manner. In some embodiments, the structure 110 may be implemented by an unextendable structure.

The antenna 120 may be mounted to a portion of the extendable structure, such as an end that is extended vertically away from the ground. When extended, the structure may position the antenna to communicate with a system while avoiding obstructions such as trees and buildings.

In some embodiments, the device mounted to the structure may be any device (in place of or in addition to antenna device 120) that may be oriented as a result of a bore sight operation. For example, the mounted device may be a rifle, laser sight, or some other device. For purposes of discussion, the alignment device 130 will be discussed below in the context of an antenna mounted to an extendable tower structure, though this is not intended to limit the scope of the device mounted to the extendable structure or the structure itself.

Alignment device 130 may be used to determine and transmit position information for the antenna device 120. The alignment device may be mounted to antenna 120 or an extendable tower 110 and communicate position regarding the position of the alignment device. The position information may be used to configure communication between a remote system and an antenna associated with the position information. The position information may also be used to communicate changes in position of the alignment device—and corresponding antenna—as the structure 110 is extended or retracted. The alignment device may provide position information to a remote computing device via wireless or a wired connection.

Figure 2:
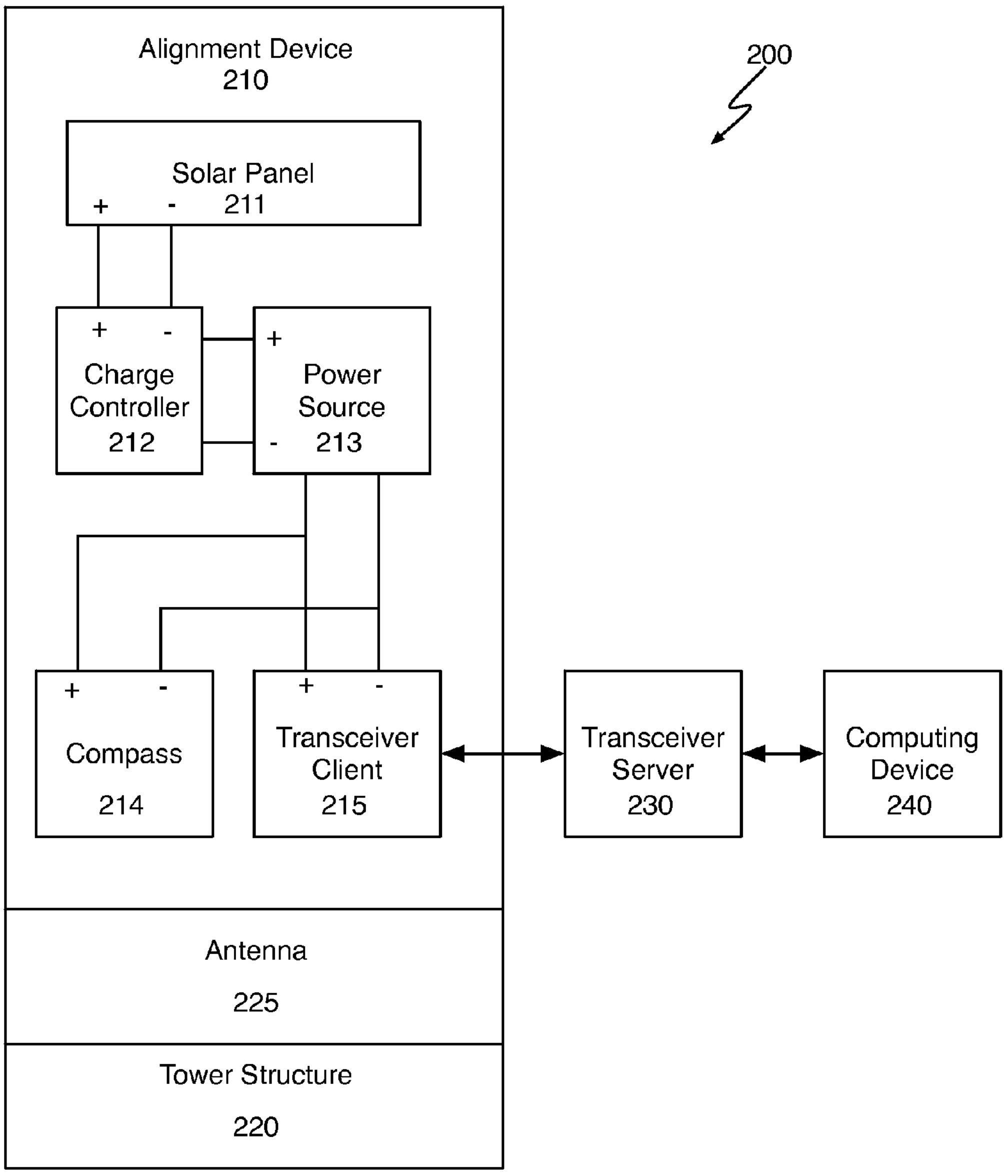
FIG. 2 illustrates an exemplary alignment device.

FIG. 2 illustrates an exemplary alignment device 210. Alignment device 210 may include solar panel 211, charge controller 212, power source 213, compass 214, and transceiver 215. The alignment device may include a non-metallic enclosure or housing for encasing the charge controller, power source, compass, and transceiver. The alignment device 210 may be coupled to antenna 225, which may be coupled to tower structure 220. Alignment device 210 may be coupled to tower structure 220 directly.

In operation, solar panel 211 generates power based on received solar energy (sunlight). Solar panel 211 may utilize any appropriate photovoltaic cell, such as one or more single crystal silicon super cells. An exemplary panel may be 3/16 inches thick and provide 18 volts at 1 amp. An exemplary panel may provide 18 watts of power. Solar panel 211 may provide power to charge controller 212.

Charge controller 212 may receive power from solar panel 211 and charge power source 213. Charge controller 212 may be implemented with any suitable charge controller, such as for example Morningstar's "Sunguard" solar charge controller. Power source 213 may include a battery or other power source. When implemented as a battery, the power source 213 may be a 12 Volt battery having a 9 AH capacity. An exemplary battery for use with the present invention may include an MK-Powered ESP-12 volt battery. Power source 213 provides power to transceiver client 215 and compass 214.

Transceiver client 215 receives power from power source 213 and communicates with compass 214. Transceiver client 215 may receive position data from compass 214 and may transmit instructions, configuration data, and other data to compass 214. Transceiver client 215 may transmit and receive data with a remote transceiver, such as transceiver server 230. For example, transceiver client 215 may receive position data from compass 214 and transmit the data to transceiver server 230. Transceiver client 215 may also receive a compass configuration instruction transmitted by transceiver 230, and transmit the compass instruction to compass 214. Transceiver client 215 may be implemented by a Laird Technologies CL2510 wireless serial transceiver.

Compass 214 may generate position data based on the orientation of the compass component and transmit the position data to transceiver client 215. The position data is eventually provided to a user, for example through an interface provided by computing device 240. The position data may periodically provide updates on the position of the compass, which may be associated with the antenna or structure portion that the compass 214 is attached to. The position data may include one or more of roll, pitch, and azimuth. Roll data may indicate the compass position in the context of a side moving up or down with respect to a flat plane—rotation along a longitudinal axis. Pitch may indicate the compass position in the context of a dip or rise in the front or back of the compass—rotation along a latitudinal axis. Azimuth may indicate the direction the compass is pointing.

Transceiver server 230 may communicate with transceiver client 215 and computing device 240. Transceiver 230 may communicate with computing device 240 via a wireless or a wired connection, such as an RS232 connection. Similar to transceiver client 215, transceiver server 230 may be implemented by a Laird Technologies CL2510 wireless serial transceiver.

Computing device 240 may receive position data from transceiver server 230. The data may be generated by compass 214 and transmitted to computing device 240 via the transceiver client-server pair. Computing device may receive the position data and display the data to a user to dynamically indicate the position of compass 214 and corresponding alignment device 210.

Figure 3:
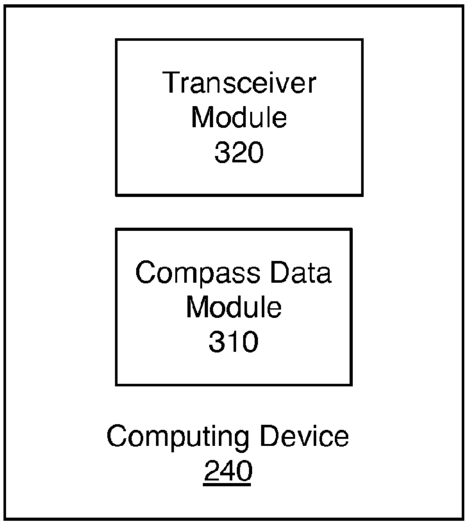
FIG. 3 illustrates a block diagram of exemplary computing device modules for processing information from an alignment device.

FIG. 3 illustrates a block diagram of exemplary computing device modules for processing information from an alignment device. The modules may be implemented by software programs stored in memory of computing device 240 and may be used to perform the functionality described herein with respect to receiving and displaying position data. Computing device 240 may include transceiver module 320 and compass data module 310. Transceiver module 320 may be stored in memory and executed by a processor on computing device 240 to configure a connection with transceiver 230.

Compass data module 310 may be stored in memory and executed by a processor on computing device 240 to receive and manage display of position data. The position data may be displayed in a dashboard interface, a scrolling interface, or in some other manner. Each of the display mechanisms may be controlled by compass data module 310.

Figure 4:
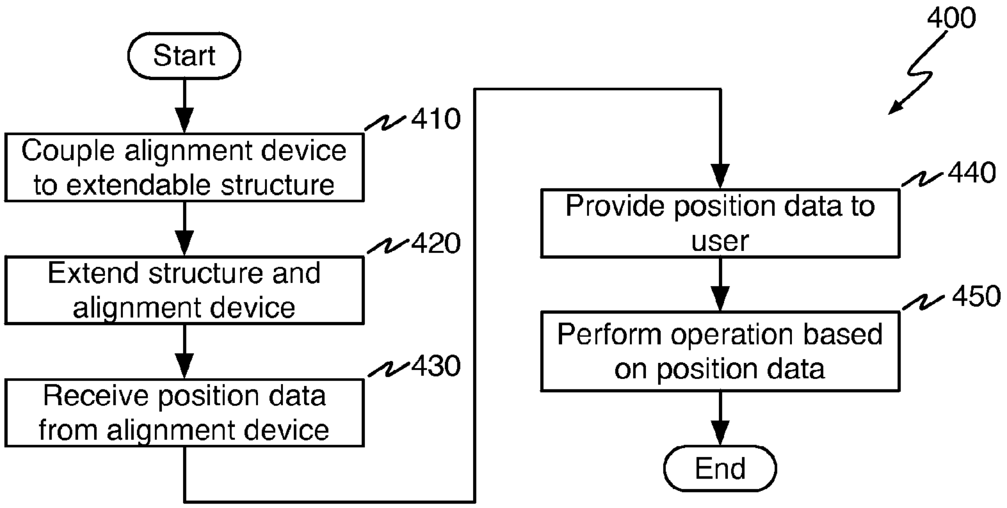
FIG. 4 illustrates an exemplary method for providing position data.
Figure 5:
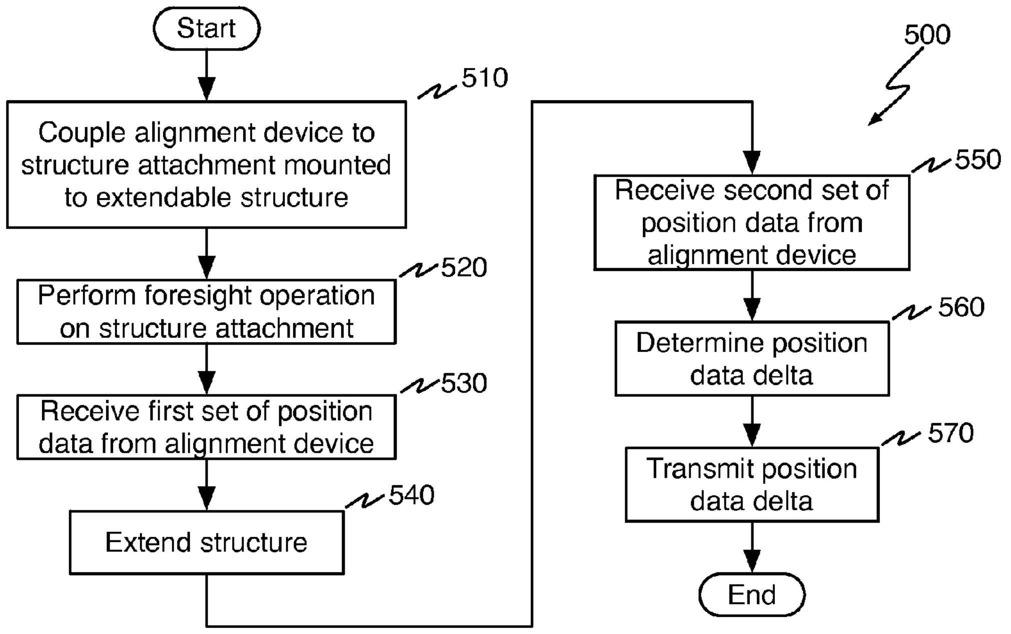
FIG. 5 illustrates another exemplary method for providing position data.

The alignment device of the present invention may be used in several ways. For example, the alignment device can be used to provide position data for a device, such as an antenna, whether a bore sight operation is performed or not. FIGS. 4-5 describe methods for using an alignment device both with and without performing a bore sight operation.

FIG. 4 illustrates an exemplary method for providing position data. The method of FIG. 4 is an example of use of position of data without performing a bore sight operation on the antenna to which to the alignment device is associated with. First, an alignment device is coupled to an extendable structure at step 410. The extendable structure may be an extendable tower which includes an antenna. The extendable structure and alignment device may then be extended at step 420.

Position data may be received from an alignment device at step 430. The position data may include roll, pitch and azimuth data, and may be received dynamically from a compass within the alignment device via a transceiver client and server. The position data may be provided to a user at step 440. The data may be provided via display in an interface, an electronic message to a remote device, or in some other manner. An operation may be performed based on the position data at step 450. The operation may include adjusting the extendable tower by extending or retracting the tower, configuring a system in communication with the antenna based on the position data, or some other operation.

FIG. 5 illustrates another exemplary method for providing position data. The method of FIG. 5 is an example of use of position of data that includes performing a bore sight operation on the antenna to which to the alignment device is associated with. First, the alignment device is coupled to a structure attachment which is mounted to the extendable structure at step 510. The structure attachment may include an antenna. A bore sight operation may be performed on the antenna at step 520. The bore sight operation may position the antenna to be most useful to the system in communication with the antenna. A first set of position data is received from the alignment device at step 530. The first set of position data may relate to the position of the antenna after the bore sight operation.

The structure is extended at step 540. A second set of position data may be received from the alignment device at step 550. The second set of position data may reflect the alignment device position after the structure supporting the antenna has been extended. A position data delta is determined at step 560. The delta is the difference between the first set of position data and the second set of position data. For example, the delta may be the difference in each of roll, pitch, and azimuth. The delta of the position data sets is then provided at step 570. The delta may be provided to a user of computing device 240 via a graphical interface, may be communicated to a remote system, or stored in memory.

Figure 6:
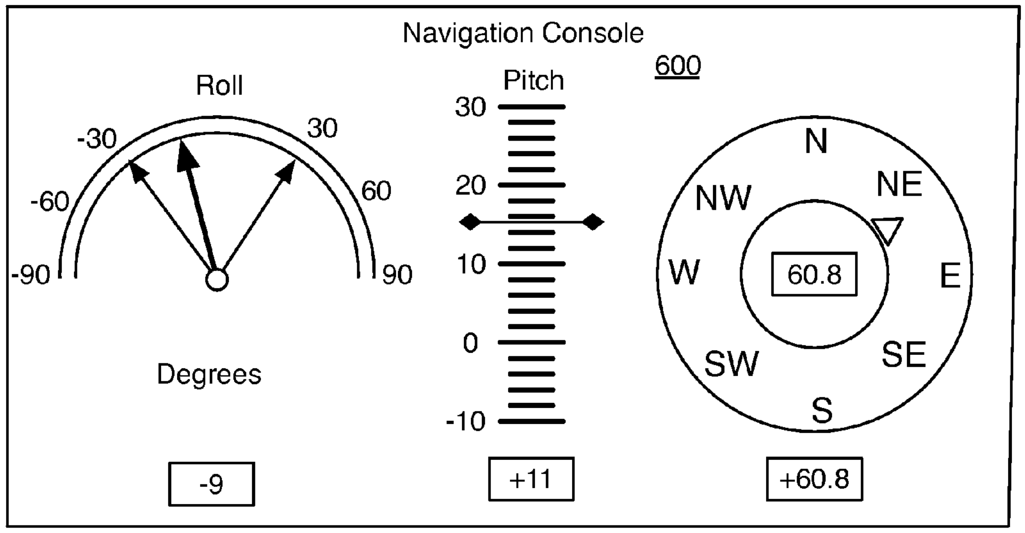
FIG. 6 illustrates an exemplary interface for providing position data.

FIG. 6 illustrates an exemplary interface for providing position data. In some embodiments, the interface 600 of FIG. 6 may be provided by compass data module 310. Interface 600 provides a dashboard of position data communicated by compass module 214. The dashboard may be updated dynamically, periodically, or based on events such movement of the extendable tower on which the alignment device is coupled.

Display 600 provides information for roll, pitch, and azimuth. The roll position data is provided as a measure of rotation along a longitudinal axis in units of degrees. The scale illustrated in display 600 ranges from minus ninety degrees to plus ninety degrees. The display may provide roll data in analog or digital format.

The pitch position data is provided as a scale from a positive number to a negative number. The pitch position data may be presented via analog or digital form. The azimuth position data may indicate a direction in which the alignment device is pointing. The azimuth position data may be presented via analog or digital form.

Figure 7:
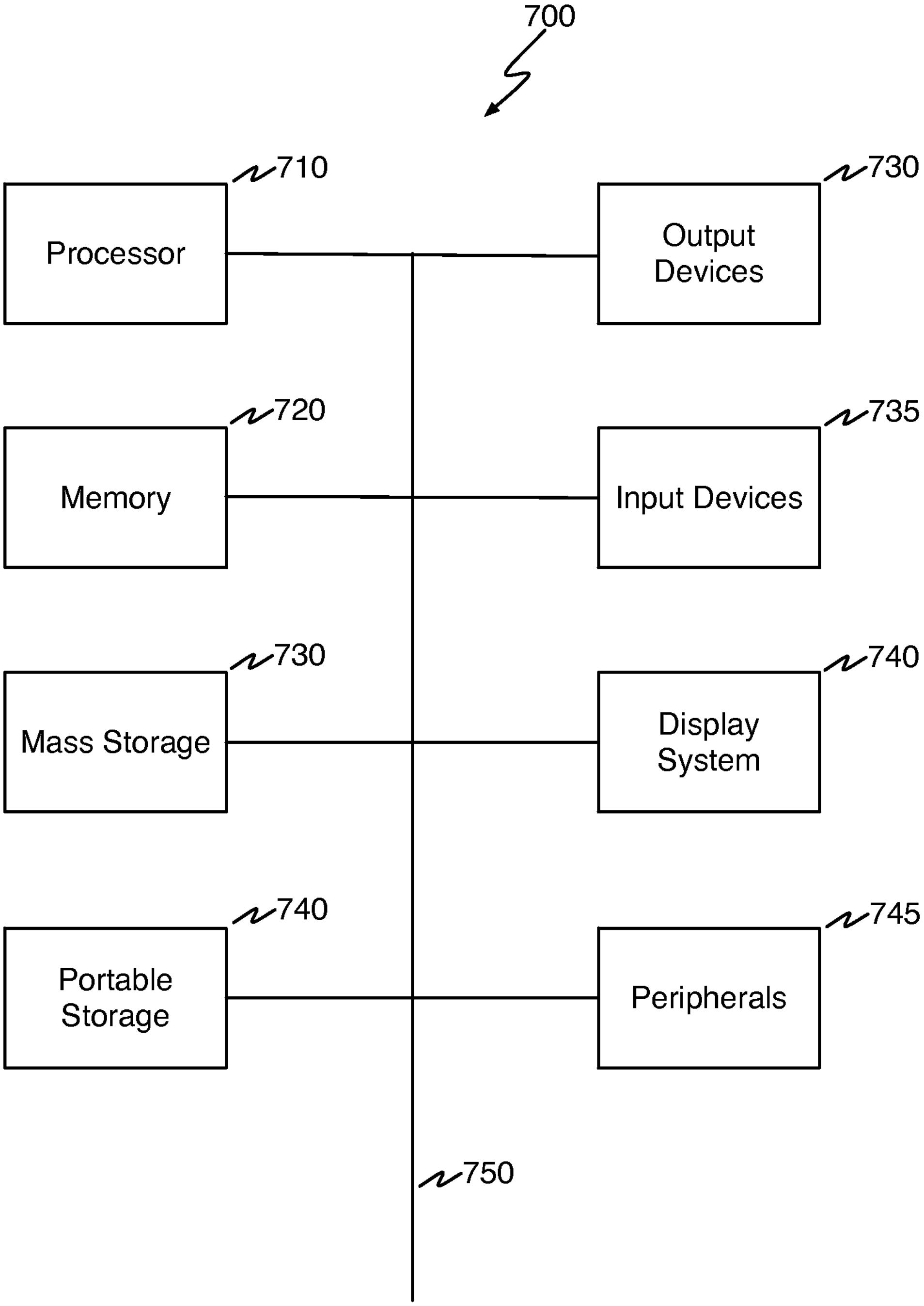
FIG. 7 illustrates an exemplary system for implementing a computing device.

FIG. 7 illustrates an exemplary system for implementing a computing device. System 700 of FIG. 7 may be implemented in the contexts of the likes of computing device 240. The computing system 700 of FIG. 7 includes one or more processors 710 and memory 715. Main memory 715 stores, in part, instructions and data for execution by processor 710. Main memory 715 can store the executable code when in operation. The system 700 of FIG. 7 further includes a mass storage device 720, portable storage medium drive(s) 725, output devices 730, user input devices 735, a graphics display 740, and peripheral devices 745.

The components shown in FIG. 7 are depicted as being connected via a single bus 750. However, the components may be connected through one or more data transport means. For example, processor unit 710 and main memory 715 may be connected via a local microprocessor bus, and the mass storage device 720, peripheral device(s) 745, portable storage device 725, and display system 740 may be connected via one or more input/output (I/O) buses.

Mass storage device 720, which may be implemented with a magnetic disk drive or an optical disk drive, is a non-volatile storage device for storing data and instructions for use by processor unit 710. Mass storage device 720 can store the system software for implementing embodiments of the present invention for purposes of loading that software into main memory 715.

Portable storage device 725 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device 725.

Input devices 735 provide a portion of a user interface. Input devices 735 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 730. Examples of suitable output devices include speakers, printers, network interfaces, and monitors.

Display system 740 may include a liquid crystal display (LCD) or other suitable display device. Display system 740 receives textual and graphical information, and processes the information for output to the display device.

Peripherals 745 may include any type of computer support device to add additional functionality to the computer system. For example, peripheral device(s) 745 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The invention has been described herein in terms of several preferred embodiments. Other embodiments of the invention, including alternatives, modifications, permutations and equivalents of the embodiments described herein, will be apparent to those skilled in the art from consideration of the specification, study of the drawings, and practice of the invention. The embodiments and preferred features described above should be considered exemplary, with the invention being defined by the appended claims, which therefore include all such alternatives, modifications, permutations and equivalents as fall within the true spirit and scope of the present invention.

What is claimed is:

1. A method for determining a structure alignment, comprising:

receiving a first set of position data over a wireless connection from an alignment device coupled to a structure, the first set of position data associated with an alignment of a portion of the structure which is not within reach of a user, the structure configured to be extendable such that a portion of the structure having the alignment device extends to a position out of reach of the user;

providing the position data to a user through an interface;

receiving a prior set of position data over the wireless connection from the alignment device coupled to the structure, the prior set of position data associated with a bore sight operation performed on an antenna coupled to the structure; and providing a delta between the first set of position data and the prior set of position data to the user through the interface.

2. The method of claim 1, the alignment device powered by solar power.

3. The method of claim 1, wherein the alignment device is coupled to an antenna on the structure.

4. The method of claim 1, wherein the structure is an extendable tower.

5. The method of claim 1, wherein the first set of position data is received when the extendable tower is at an extended position and a prior set of position data is received when the extendable tower is at a retracted position.

6. The method of claim 1, the position data including at least one of roll, pitch, and azimuth data.

7. The method of claim 1, wherein the position data is provided through a graphical interface.

8. A non-transitory computer readable storage medium having embodied thereon a program, the program being executable by a processor to perform a method for determining a structure alignment, the method comprising:

receiving a first set of position data over a wireless connection from an alignment device coupled to a structure, the first set of position data associated with an alignment of a portion of the structure which is not within reach of a user, the structure configured to be extendable such that a portion of the structure having the alignment device extends to a position out of reach of the user;

providing the position data to a user through an interface;

receiving a prior set of position data over the wireless connection from the alignment device coupled to the structure, the prior set of position data associated with a bore sight operation performed on an antenna coupled to the structure; and providing a delta between the first set of position data and the prior set of position data to the user through the interface.

9. The non-transitory computer readable storage medium of claim 8, wherein the alignment device is coupled to an antenna on the structure.

10. The non-transitory computer readable storage medium of claim 8, wherein the structure is an extendable tower.

11. The non-transitory computer readable storage medium of claim 8, wherein the first set of position data is received when the extendable tower is at an extended position and a prior set of position data is received when the extendable tower is at a retracted position.

12. The non-transitory computer readable storage medium of claim 8, the position data including at least one of roll data, pitch data and azimuth data.

13. The non-transitory computer readable storage medium of claim 8, wherein the position data is provided through a graphical interface.

14. A system for remotely determining position data for an extendable structure, comprising:

an independent power source;

an alignment device contained in a housing mounted at the top of the extendable structure and receiving power from the independent power source, the alignment device configured to provide position data associated with the position of the system, the position data including roll, pitch, and azimuth data; and a transceiver receiving power from the independent power source and configured to transmit the position data to a remote computing device.

15. The system of claim 14, wherein the alignment device configured to provide a first set of position data when the extendable structure is retracted and a second set of data when the extendable structure is extended.

16. The system of claim 14, wherein the power source is a solar power source.

17. The system of claim 14 wherein:

the extendable structure is an extendable tower, extendable and retractable using a controller;

the alignment device contained in a housing mounted at the top of the extendable structure is mounted on a narrow band antenna that is mounted at the top of the extendable tower; and the transceiver is configured to receive remote signals to control bore sighting the narrow band antenna.

18. The system of claim 14 wherein:

the extendable structure is an extendable tower, extendable and retractable using a controller;

the alignment device contained in a housing mounted at the top of the extendable structure is mounted on a laser sight that is mounted at the top of the extendable tower; and the transceiver is configured to receive remote signals to control bore sighting the laser sight.

19. The system of claim 14 wherein:

the extendable structure is an extendable tower, extendable and retractable using a controller;

the alignment device contained in a housing mounted at the top of the extendable structure is mounted on a rifle that is mounted at the top of the extendable tower; and the transceiver is configured to receive remote signals to control bore sighting the rifle.

* * * * *